United States Patent [19]

Stornetta

[11] Patent Number: 5,311,914
[45] Date of Patent: May 17, 1994

[54] ATTACHMENT FOR A PORTABLE ROUTER

[75] Inventor: Ase J. Stornetta, Walnut Creek, Calif.

[73] Assignee: Ritter Manufacturing, Inc., Antioch, Calif.

[21] Appl. No.: 46,638

[22] Filed: Apr. 14, 1993

[51] Int. Cl.⁵ .................... B27M 3/00; B27G 19/00
[52] U.S. Cl. ................................ 144/372; 51/273;
 144/134 D; 144/136 C; 144/144 R; 144/371;
 144/144.5 R; 409/137; 409/182
[58] Field of Search ............... 15/312.2, 329, 330;
 51/273; 144/134 D, 136 C, 144 R, 144.5, 251 A,
 252 R, 252 A, 371, 372; 409/137, 182

[56] References Cited

U.S. PATENT DOCUMENTS

| | | | |
|---|---|---|---|
| 2,852,051 | 9/1958 | Bickner | 144/252 R |
| 2,944,465 | 7/1960 | Jones | 144/252 R |
| 3,022,806 | 2/1962 | Johnston | 144/252 R |
| 3,167,260 | 1/1965 | Gibbons et al. | 51/273 |
| 3,333,462 | 7/1967 | Williams | 144/144 R |
| 3,862,521 | 1/1975 | Isaksson | 51/273 |
| 3,910,327 | 10/1975 | Heckenlaible | 144/144 R |
| 3,942,411 | 3/1976 | Gerber | 409/137 |
| 4,011,792 | 3/1977 | Davis | 409/137 |
| 4,037,982 | 7/1977 | Clement | 408/67 |
| 4,051,880 | 10/1977 | Hestily | 144/252 R |
| 4,409,699 | 10/1983 | Moorhouse | 144/252 R |
| 4,606,685 | 8/1986 | Maier et al. | 144/251 A |
| 4,613,261 | 9/1986 | Maier et al. | 409/137 |
| 4,738,571 | 4/1988 | Olson et al. | 408/67 |
| 4,742,855 | 5/1988 | Hartley | 144/252 R |
| 4,750,536 | 6/1988 | Grisley | 144/252 R |
| 4,821,365 | 4/1989 | Charters | 144/252 R |
| 4,822,219 | 4/1989 | Wood et al. | 144/252 R |
| 4,930,264 | 6/1990 | Huang | 51/273 |
| 4,986,703 | 1/1991 | Hampl et al. | 144/252 R |

FOREIGN PATENT DOCUMENTS 658817 10/1991 United Kingdom.

OTHER PUBLICATIONS

UNIQUE Solid Door Systems-Model 290 Brochure, UNIQUE Mach & Tool Co., Jan. 1993.

Primary Examiner—W. Donald Bray
Attorney, Agent, or Firm—Haverstock, Medlen & Carroll

[57] ABSTRACT

A router dust hood has a sub base which attaches to the base plate of a router. A dust hood slides over the motor and is coupled to the sub base. The handles of the router are taken off and mounted on to the hood. A top rubber casing slides over the motor and is coupled to the top of the dust hood. A vacuum is coupled to the dust hood for the removal of chips and dust from the work area. The sub base raises the router off the work surface allowing more air volume around the router bit to aid in the quickened removal of dust and chips from the work area into the vacuum. The sub base is circularly designed, with an outer lip, allowing an operator to guide the router on a template.

28 Claims, 3 Drawing Sheets

ATTACHMENT FOR A PORTABLE ROUTER

FIELD OF THE INVENTION

This invention relates to the field of portable routers. More particularly this invention relates to the field of attachments for routers to gather dust and chips from the router.

BACKGROUND OF THE INVENTION

A conventional portable router is illustrated in FIG. 1. The router has a motor 10 which attaches to the base 11 of the router. A sub base attaches to the plate 14 of the base of the router. A router bit is attached inside the router base 11 and driven by the router motor 10. The handles 12 are attached to the base 11 and allow an operator to guide the router when in operation.

A router is used to cut grooves into wood for ornamental and decorative purposes in such things as cabinets, doors and furniture. When a conventional portable router is used, a tremendous amount of dust and chips are thrown from the router bit through the opening 15 and into the air. The motor 10 pulls air through it for cooling purposes, this air flow further serves to scatter chips and dust around the work area.

The chips thrown from the router bit can be harmful to the operator, causing cuts and scrapes as well as allergic reactions if the operator is allergic to the type of wood being worked. The Occupational Safety and Health Association (OSHA) has very strict guidelines about this type of activity in the work place.

The OSHA regulations for these types of machines can be found in 29 CFR § 1910.212. Specifically in subsection (a) the regulations provide that:

> ... One or more methods of machine guarding shall be provided to protect the operator and other employees in the machine area from hazards such as those created by point of operation, ... flying chips and sparks.

Thus, in the work place it is now very important that a router is guarded to comply with these OSHA regulations.

A router dust guard was presented by E. F. Johnston in U.S. Pat. No. 3,022,806. This router dust guard is designed to fit over a router that is a single component with the motor and bit both housed in the router housing 16. The guard 18 slides over the router housing 16 and is connected to the lower router flange 13. This guard 18 would not work with the conventional router illustrated in FIG. 1 because it is designed to fit over a router housing having a circular housing and thus would not fit over the motor 10 and the handle acceptors. A conventional router allows the operator to adjust the motor up and down depending on the depth of cut desired. The router dust guard as presented by Johnston would not allow the operator to make those adjustments.

A dust removal attachment for a router was presented by Charters in U.S. Pat. No. 4,821,365. This dust removal attachment has a diamond shaped base plate 12 which connects to a mounting flange 32 having a concave body portion 26. The vacuum attachment 20 is positioned over this concave body portion 26 to remove dust and chips. This invention also uses bristles 30 to surround the aperture 14 and the bit.

Pin routers are well known in the art. Built as a stationary machine, a Pin router has a router bit on an extension arm, positioned above a table. The piece of wood to be cut is slid on the table, under the router bit. Instead of the router bit being moved about the wood as in a conventional portable router, when using a pin router the wood is moved by the operator around the router bit to cut the pattern into the wood.

Computer Numerical Controlled (CNC) Routers are also well known in the prior art. CNC routers will automatically cut a preprogrammed ornamental pattern into a piece of wood of a specified size. These CNC routers are big, expensive and can be slow if more than one size of router bit must be used in the pattern. Because of their size the CNC routers are not portable.

Thus, it would be desirable if a router dust hood could be adapted for a conventional portable router which would allow for cooler motor operation and lower wear on the router motor and bit. It would also be desirable if the router dust hood could be used to eliminate extraordinary heat buildup, reduce fire hazards and eliminate operator injury caused by airborne dust and chips.

SUMMARY OF THE INVENTION

An attachment for a portable router has a sub base which attaches to the base plate of a router. A dust hood slides over the motor and is coupled to the sub base. The handles of the router are taken off and mounted on to the hood. A top rubber casing slides over the motor and is coupled to the top of the dust hood. A vacuum is coupled to the dust hood for the removal of chips and dust from the work area. The sub base raises the router off the work surface allowing more air volume around the router bit to aid in the quickened removal of dust and chips from the work area into the vacuum. The sub base is circularly designed, with an outer lip, allowing an operator to guide the router on a template.

An attachment to a portable router that is to be used in a work area and has a base, a motor, and a bit, comprises a circular sub base coupled to the base of the router and means for trapping and removing dust and wood particles from the portable router and the work area. The means for trapping and removing is comprised of a dust hood coupled to the circular sub base, the dust hood positioned around the base of the router. The attachment to a portable router also comprises a vacuum source coupled to the dust hood for removing chips and dust from the work area, thereby protecting an operator from injury caused by airborne dust and chips. The removal of chips and dust is enhanced by a natural flow of air through a motor of the router. The circular sub base is of a sufficient size to provide for cooler motor operation and lower wear on the motor and router bit. The circular sub base comprises an inner ridge and an outer lip, the base of the router coupled to the inner ridge and the dust hood coupled to the outer lip. The diameter of the outer lip and the diameter of the dust hood are larger than the largest diameter of the router. The dust hood further comprises handles for guiding the operation of the router and an extendable hinge for tightening the dust hood to the base of the router. The attachment to a portable router further comprises a top casing coupled to the dust hood and the base of the router.

A pattern routing system to be used in a work area for cutting ornamental patterns into a piece of wood with a portable router, comprises a circular sub base coupled to a base of said router, a template positioned around a piece of wood for guiding the router around in a pattern, over the wood, the template adapted for cooperatively interacting with the circular sub base, and means for trapping and removing dust and wood particles from the portable router and the work area. The means for trapping and removing dust and wood particles is comprised of a vacuum source and is coupled to the base of the router. The means for trapping and removing is also comprised of a dust hood coupled around the base of the router and to the circular sub base. The dust hood has a diameter larger than the largest diameter of the router. The means for trapping and removing is further comprised of a top casing coupled to the dust hood and the base of the router. The removal of chips and dust is enhanced by a natural flow of air through a motor of the router thereby eliminating extraordinary heat buildup and reducing fire hazards. The circular sub base comprises an inner ridge and an outer lip, the base of the router coupled to the inner ridge and the dust hood coupled to the outer lip. The dust hood further comprises handles for guiding the operation of the router and an extendable hinge for tightening the dust hood to the base of the router. The template is comprised of a plurality of pieces of aluminum tubing.

A method for cutting a pattern into a piece of wood using a router, the method comprising the steps of positioning a template around a piece of wood, coupling a circular sub base to a base of a router, the circular sub base adapted to cooperatively interact with the template, coupling a dust hood to the circular sub base and to the base of the router, creating a vacuum inside the dust hood for removing chips and dust from around a router bit, and guiding the router around the template using the sub base, to cut a pattern in the piece of wood. The circular sub base comprises an inner ridge and an outer lip, the base of the router coupled to the inner ridge and the dust hood coupled to the outer lip. The router is guided by handles coupled to the dust hood. The dust hood is coupled to the base of the router by an extendable hinge. The vacuum is created by connecting an outside vacuum source to the dust hood. The removal of dust and chips is enhanced by a natural flow of air through a motor of the router. The template is comprised of a plurality of pieces of aluminum tubing.

DESCRIPTION OF THE INVENTION

The present invention includes a router dust hood which will take advantage of the natural air flow of a commercial portable router to direct wood dust and chips trapped by the hood adapter into a vacuum channel and then into a vacuum, removing the dust and chips from the work area and the area inside the base and around the bit. A sub base to be used with the router dust hood can replace the sub base of a conventional portable router and can be used to couple the dust hood to the router.

The present invention also includes a method of cutting ornamental patterns into doors using the sub base of the router dust hood and a template. By "template", it is meant a frame placed on or around a piece of wood which, when followed using a router will leave a specific ornamental pattern cut into the wood; the present invention contemplates variations (e.g., table saw fences, stencils, etc.) and it is not meant to be limited by the above description. The frame of the template can be made of any type of tubing, metal or other material, of any thickness and shape which will serve to direct the sub base of the present invention in the predetermined pattern. The template serves as a guide for the sub base of the router dust hood to ride against while the router is being used to cut the pattern into the door.

DETAILED DESCRIPTION OF THE PREFERRED EMBODIMENT

Figure 1:
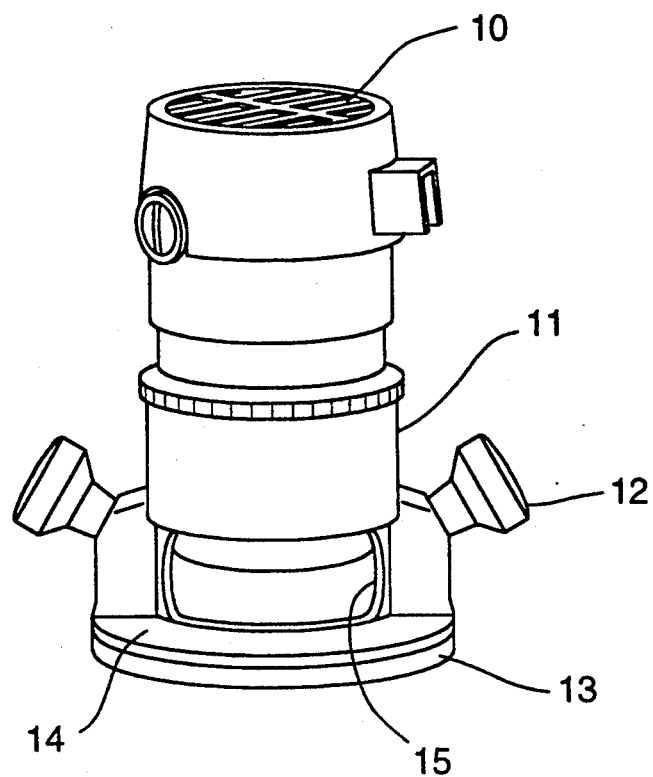
FIG. 1 illustrates a conventional router.
Figure 4:
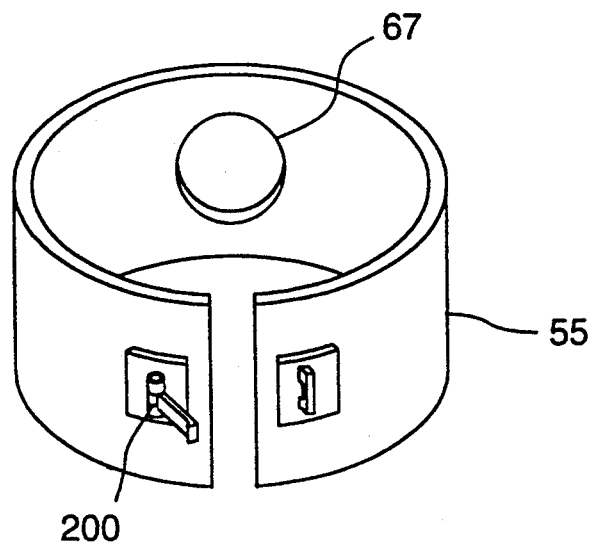
FIG. 4 illustrates an alternate embodiment of the dust hood of the present invention.
Figure 2:
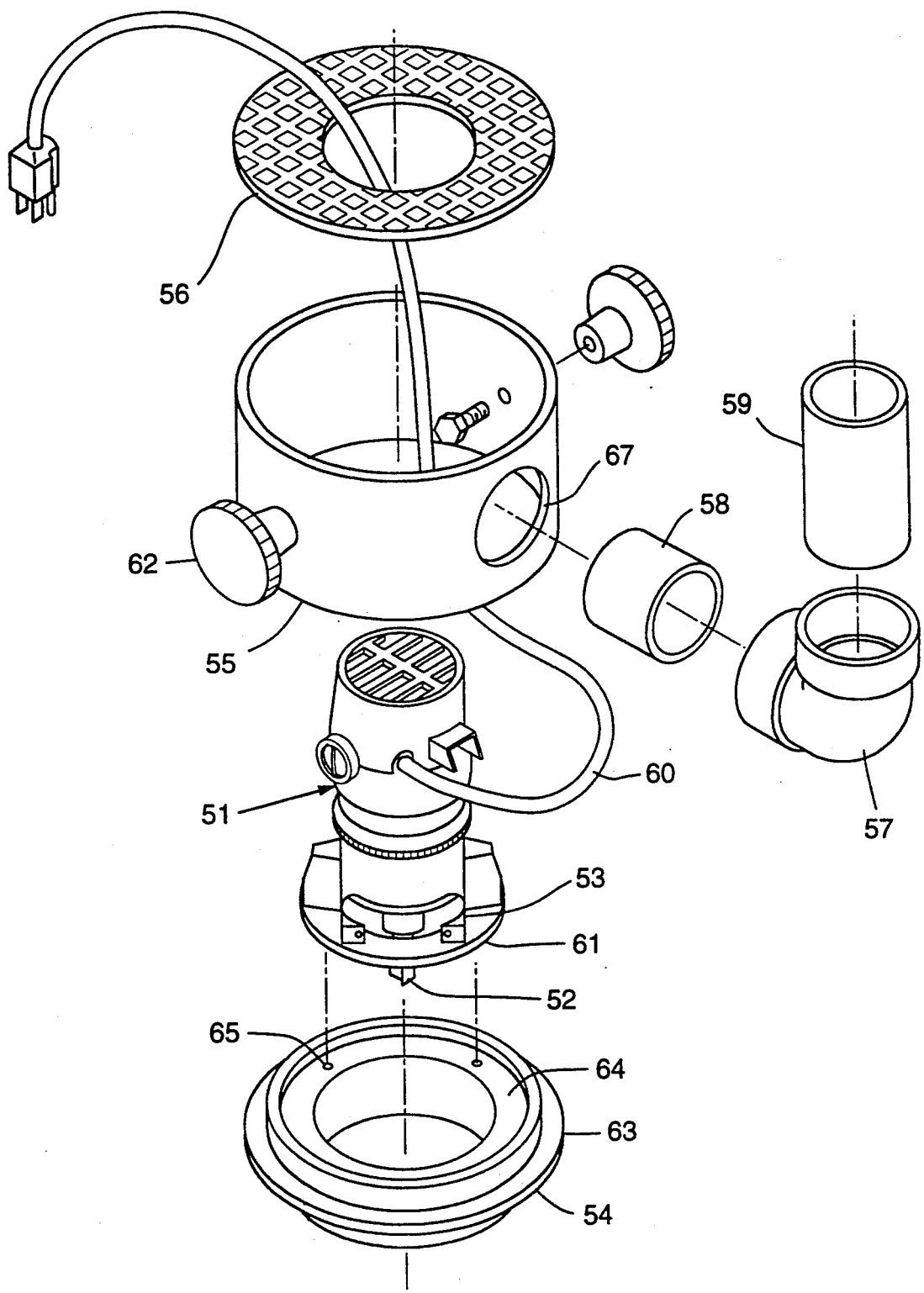
FIG. 2 illustrates the components of the router dust hood of the present invention and how they attach to a conventional router.

The router dust hood of the present invention is illustrated in FIG. 2. A conventional router is shown with a motor 51, a base 53 and a bit 52. The base 53 is positioned around the bit 52 to protect an operator from the rotation of the bit 52 and to aid in the operation of the router. The motor 51 is powered by a connection to an AC source through the power cord 60 and is used to rotate the bit 52.

A sub base 54 is coupled to the base plate 61 of the router. The sub base 54 has an inner ridge 64 which the base plate 61 of the router fits on and the sub base 54 is secured to the base plate 61 of the router by the screws 65 which extend through the base plate 61 and into the sub base 54. The sub base 54 has an outer lip 63 extending outward from the router at the same height on the sub base 54 as the inner ridge 64. The sub base 54 extends downward from the router below the outer lip 63 so that the router is raised off of the work surface.

The sub base 54 of the present invention is made out of cast nylon but any other suitable material will do. The height of the sub base can be changed according to the application and the size of the router. The sub base 54 can be made to fit the base plate 61 of any size of portable router.

The handles 62 are taken off of the router base 53 and secured to the dust hood 55. The dust hood 55 is made to slide over the motor 51, rest on the outer lip 63 and cover the base 53 of the router. The dust hood 55 has an aperture 67 which is used to remove the dust and chips from the work area. The pipe fittings 57, 58, 59 are used to couple the dust hood 55 to the vacuum. The pipe fitting 58 fits into the aperture 67. The elbow pipe fitting 57 fits onto the pipe fitting 58 and the pipe fitting 59 fits into the elbow pipe fitting 57. A vacuum hose is then coupled to the pipe fitting 59.

The dust hood 55 of the present invention is made out of a poly-vinyl chloride (P.V.C.) pipe, but any other suitable material can be substituted. It will be apparent to one reasonably skilled in the art that the diameter of the dust hood should be at least as big as the largest diameter of the router. The outer lip of the sub base can have a diameter which is larger than the diameter of the dust hood. A covering of the openings of the router around the bit could also be substituted for the dust hood of the present invention In an alternate embodiment of the present invention, the dust hood 55 is slit on the side opposite from the aperture 67. An expandable hinge bracket 200 is coupled to the dust hood 55 on each side of the slit, allowing the dust hood 55 to be expanded to slide over the motor 51 during assembly and removal of the dust hood on a router.

The top rubber casing 56 slides over the motor 51 and rests on the top of the dust hood 55. The top rubber casing is designed to fit securely around the top of the base 53 of the router, forming a seal. The dust hood 55 is designed so that it rests on the outer lip 63 of the sub base 54 away from the router and the base 53. The top rubber casing 56 covers the dust hood 55 and makes a seal with the top of the base 53 of the router, preventing the dust and chips from escaping out of the top of the dust hood 55.

Figure 3:
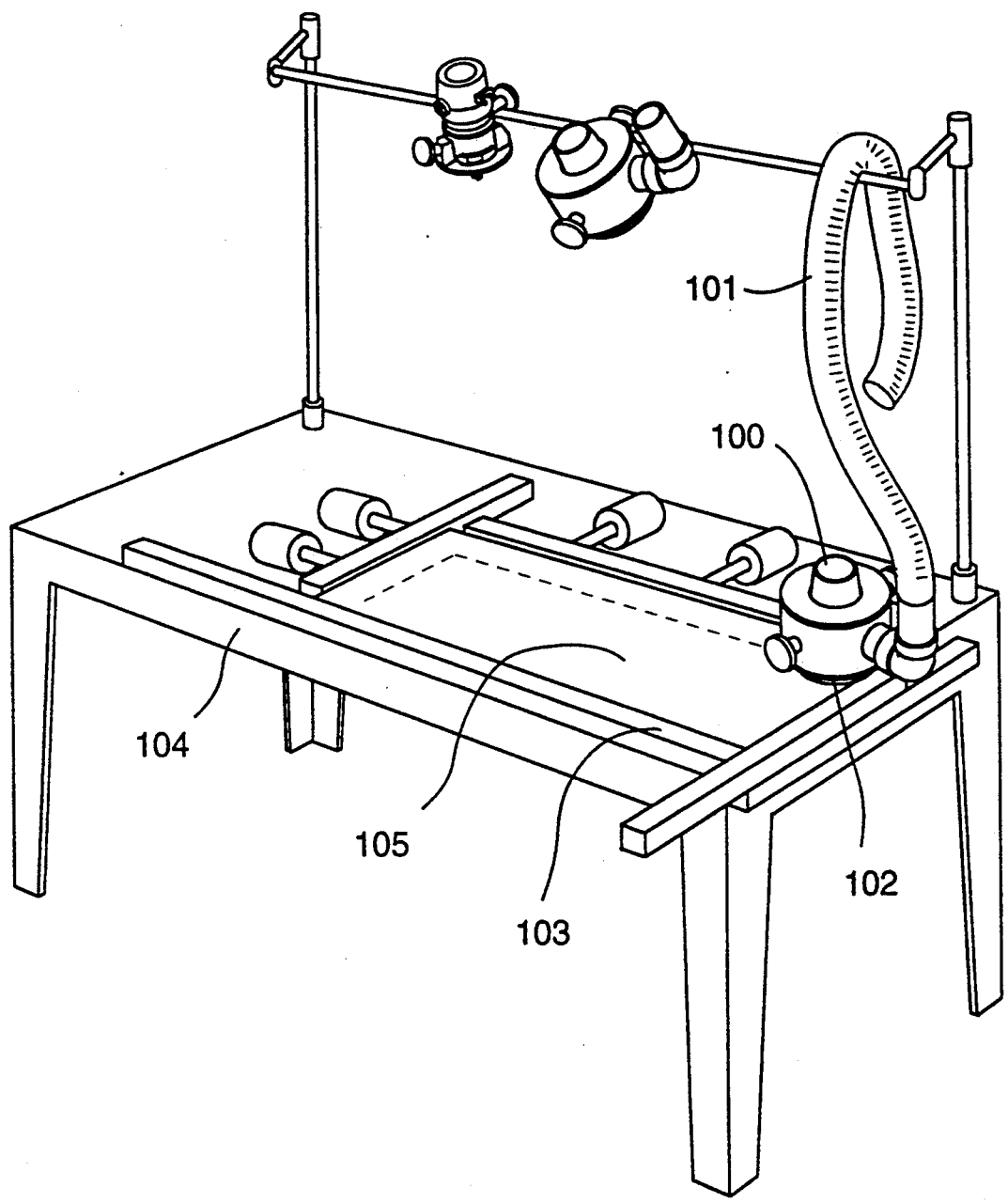
FIG. 3 illustrates a router with a dust hood on a table with a template for a cabinet door.

A router with a dust hood and template are illustrated in FIG. 3. The router 100 is coupled to a sub base 102, a dust hood and a vacuum hose 101. A template 103 consisting of square metal tubing is positioned around a cabinet door 105 and is coupled to the table 104. The template 103 is designed so that the sub base 102 can be positioned against the template 103 and the pattern can be cut into the cabinet door 105. The router is guided by the operator around the interior edge of the template with the sub base contacting the template.

The sub base 102 has a circular design so that it can be rotated around while being operated and as long as the sub base 102 is contacting the template 103, the correct pattern will be cut into the cabinet door 105. The rotation of the router bit and its contact with the wood pulls the router 100 away from the center of the cabinet door, making it easier for the operator to guide the router 100 around the template. The Dust Removal Attachment as disclosed by Charters in U.S. Pat. No. 4,821,365 does not have a circular sub base and therefore could not be rotated around while being operated and could not be used with a template.

The motor 51 of the router pulls air through it for cooling purposes. This air flow aids in removing the dust and chips from the work surface. The dust hood 55 is designed to fit on the outer lip 63 of the sub base 54 to maximize the air volume and space around the router bit. The height of the sub base 54 also serves to add additional air volume around the router bit. The amount of air volume added by the dust hood 55 and the raised sub base 54 help move the chips and dust from the work surface to the vacuum faster. Because the chips are moved from the work surface to the vacuum faster, the router bit does not become dull as fast as bits used on conventional routers.

Cooler motor operation and lower wear on the router motor and bit are provided for by the present invention, because there is an enlarged amount of air volume added by the dust hood 55 and the raised sub base 54. The dust hood 55 also serves to eliminate heat buildup around the router and thereby reduces fire hazards in the work place. The dust hood 55 also removes the chance of operator injury caused by airborne dust and chips.

The Router Dust Guard as disclosed by E. F. Johnston in U.S. Pat. No. 3,022,806 does not have a substantive amount of air volume around the router bit. The guard 18 is made to fit tightly over the router housing 16 and the router dust guard has no sub base. The only air volume around the router bit is comprised of the air space in the interior of the router housing.

Improvements and modifications which become apparent to persons of ordinary skill in the art only after reading this disclosure, the drawings and the appended claims are deemed within the spirit and scope of the present invention.

I claim:
1. An attachment to a portable router, the portable router to be used in a work area and having a base, a motor, and a bit, the attachment comprising:
   a. a circular sub base coupled to said base of said portable router; and
   b. means for trapping and removing dust and wood particles from the portable router and the work area, the means for trapping and removing coupled to the base.
2. The attachment to a portable router as claimed in claim 1 wherein the means for trapping and removing is comprised of a dust hood, the dust hood positioned around the base of the router.
3. The attachment to a portable router as claimed in claim 2 further comprising a vacuum source coupled to the dust hood for removing chips and dust from a work area, thereby protecting an operator from injury caused by airborne dust and chips.
4. The attachment to a portable router as claimed in claim 1 wherein the removal of chips and dust is enhanced by a natural flow of air through a motor of the router.
5. The attachment to a portable router as claimed in claim 4 whereby the circular sub base has a diameter of a sufficient size to provide for cooler motor operation and lower wear on the motor and router bit.
6. The attachment to a portable router as claimed in claim 2 wherein the circular sub base comprises an inner ridge and an outer lip, the base of the router coupled to the inner ridge and the dust hood coupled to the outer lip.
7. The attachment to a portable router as claimed in claim 6 wherein the diameter of the outer lip and the diameter of the dust hood are larger than the largest diameter of the router.
8. The attachment to a portable router as claimed in claim 1 wherein the dust hood further comprises handles for guiding the operation of the router.
9. The attachment to a portable router as claimed in claim 1 wherein the dust hood further comprises an extendable hinge for tightening the dust hood to the base of the router.
10. The attachment to a portable router as claimed in claim 1 further comprising a top casing coupled to the dust hood and the base of the router.
11. A pattern routing system to be used in a work area for cutting ornamental patterns into a piece of wood with a portable router, comprising:
   a. a circular sub base coupled to a base of said router;
   b. a template positioned around outer edges of a piece of wood for guiding the router around in a pattern, over the piece of wood, the template adapted for cooperatively interacting with the circular sub base; and
   c. means for trapping and removing dust and wood particles from the portable router and the work area, the means for trapping and removing coupled to the base.
12. The pattern routing system as claimed in claim 11 wherein the means for trapping and removing dust and wood particles is comprised of a vacuum source and is coupled to the base of the router.
13. The pattern routing system as claimed in claim 11 wherein the means for trapping and removing is comprised of a dust hood coupled around the base of the router and to the circular sub base.

14. The pattern routing system as claimed in claim 13 wherein the dust hood has a diameter larger than the largest diameter of the router.

15. The pattern routing system as claimed in claim 13 wherein the means for trapping and removing is further comprised of a top casing coupled to the dust hood and the base of the router.

16. The pattern routing system as claimed in claim 15 wherein the removal of chips and dust is enhanced by a natural flow of air through a motor of the router thereby eliminating extraordinary heat buildup and reducing fire hazards.

17. The pattern routing system as claimed in claim 13 wherein the circular sub base comprises an inner ridge and an outer lip, the base of the router coupled to the inner ridge and the dust hood coupled to the outer lip.

18. The pattern routing system as claimed in claim 17 wherein the dust hood further comprises handles for guiding the operation of the router.

19. The pattern routing system as claimed in claim 18 wherein the dust hood further comprises an extendable hinge for tightening the dust hood to the base of the router.

20. The pattern routing system as claimed in claim 11 wherein the template is comprised of a plurality of pieces of aluminum tubing.

21. A method for cutting a pattern into a piece of wood using a router, the method comprising the steps of:
 a. positioning a template around a piece of wood;
 b. coupling a circular sub base to a base of a router, the circular sub base adapted to cooperatively interact with the template;
 c. coupling a dust hood to the circular sub base and to the base of the router;
 d. creating a vacuum inside the dust hood for removing chips and dust from around a router bit; and
 e. guiding the router around the template using the sub base, to cut a pattern in the piece of wood.

22. The method as claimed in claim 21 wherein the circular sub base comprises an inner ridge and an outer lip, the base of the router coupled to the inner ridge and the dust hood coupled to the outer lip.

23. The method as claimed in claim 22 wherein the router is guided by handles coupled to the dust hood.

24. The method as claimed in claim 23 wherein the dust hood is coupled to the base of the router by an extendable hinge.

25. The method as claimed in claim 24 wherein the vacuum is created by connecting an outside vacuum source to the dust hood.

26. The method as claimed in claim 25 wherein the removal of dust and chips is enhanced by a natural flow of air through a motor of the router.

27. The method as claimed in claim 21 wherein the template is comprised of a plurality of pieces of aluminum tubing.

28. A method for cutting a pattern into a piece of wood using a portable router, the method comprising the steps of:
 a. positioning a template around a piece of wood;
 b. coupling a circular sub base to a base of a portable router, the circular sub base adapted to cooperatively interact with the template;
 c. coupling a dust hood to the base of the router;
 d. creating a vacuum inside the dust hood for removing chips and dust from around a router bit; and
 e. guiding the router around the template using the sub base, to cut a pattern in the piece of wood.

* * * * *